(12) United States Patent
Jones et al.

(10) Patent No.: US 10,049,341 B2
(45) Date of Patent: Aug. 14, 2018

(54) STOCK LEVEL INDICATION APPARATUS AND METHOD

(71) Applicant: Wal-Mart Stores, Inc., Bentonville, AR (US)

(72) Inventors: Nicholaus A. Jones, Fayetteville, AR (US); Robert J. Taylor, Rogers, AR (US); Aaron J. Vasgaard, Rogers, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/596,064

(22) Filed: May 16, 2017

(65) Prior Publication Data

US 2017/0330140 A1 Nov. 16, 2017

Related U.S. Application Data

(60) Provisional application No. 62/336,824, filed on May 16, 2016.

(51) Int. Cl.
*G06Q 10/08* (2012.01)
*G01F 1/34* (2006.01)
*G05B 23/02* (2006.01)

(52) U.S. Cl.
CPC ............ *G06Q 10/087* (2013.01); *G01F 1/34* (2013.01); *G05B 23/0216* (2013.01)

(58) Field of Classification Search
CPC .... G06Q 10/087; G06Q 10/08; G06Q 20/203; G01F 1/34; G05B 23/0216
See application file for complete search history.

(56) References Cited

U.S. PATENT DOCUMENTS

| | | | |
|---|---|---|---|
| 3,021,691 A | 2/1962 | Jacobs | |
| 3,426,326 A | 2/1969 | Goldstein | |
| 4,478,337 A * | 10/1984 | Flum | A47F 1/12 206/564 |
| 5,240,316 A * | 8/1993 | Dougherty | A01G 5/06 312/236 |
| 5,671,362 A | 9/1997 | Cowe | |
| 6,044,717 A | 4/2000 | Biegelsen | |
| 8,260,456 B2 | 9/2012 | Siegel | |
| 2006/0071774 A1 | 4/2006 | Brown | |
| 2007/0050271 A1 | 3/2007 | Ufford | |
| 2010/0010868 A1 | 1/2010 | Aimone Catti | |

(Continued)

OTHER PUBLICATIONS

Moorthy, Rahul, etc.; "On-Shelf Availability in Retailing"; vol. 116—No. 23; International Journal of Computer Applications; Apr. 2015; pp. 47-51.

(Continued)

*Primary Examiner* — Kristie A Mahone
(74) *Attorney, Agent, or Firm* — Fitch, Even, Tabin & Flannery LLP (57) ABSTRACT

In some embodiments, systems, apparatuses, and methods are provided herein useful to provide an indication of a stock level of a product support member. Compressed air is directed through a plurality of bores extending through the product support member. A sensor reading of the compressed air can be utilized to determine whether there are products stocked on the product support member due to the products blocking one or more of the bores.

22 Claims, 5 Drawing Sheets

(56) References Cited

U.S. PATENT DOCUMENTS

| | | |
|---|---|---|
| 2012/0229279 A1 | 9/2012 | Conley |
| 2014/0201042 A1 | 7/2014 | Meyer |
| 2015/0041616 A1 | 2/2015 | Gentile |
| 2015/0206188 A1* | 7/2015 | Tanigawa ........... G06Q 30/0261 |
| | | 705/14.58 |

OTHER PUBLICATIONS

PCT; App. No. PCT/US2017/032677; International Search Report and Written Opinion dated Jul. 27, 2017.

* cited by examiner

STOCK LEVEL INDICATION APPARATUS AND METHOD

CROSS-REFERENCE TO RELATED APPLICATIONS

This application claims the benefit of U.S. Provisional Application No. 62/336,824, filed May 16, 2016, which is hereby incorporated by reference herein in its entirety.

TECHNICAL FIELD

This invention relates generally to retail shelving and, more particularly, to stocking level indicating shelving assemblies.

BACKGROUND

Retail stores often utilize modular shelving units to display products for sale. It can be important to maintain an accurate count of inventory during operation of the store. Pursuant to this, associates often have to count products on the shelves. It can be difficult for associates to accurately determine a count of products on the shelves and, as such, one method to ensure an accurate count to remove all of the products from the shelves. Unfortunately, the associates must then restock the products on the shelves.

BRIEF DESCRIPTION OF THE DRAWINGS

Disclosed herein are embodiments of systems, apparatuses, and methods pertaining to a product support structure that provides an indication of a stocking level of products on the product support structure. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to provide an indication of a stock level of a product support member. More specifically, compressed air is directed through a plurality of bores extending through the product support member. A sensor reading of the compressed air can be utilized to determine whether there are products stocked on the product support member, such as through a flow rate or pressure thereof, due to the products blocking one or more of the bores.

A product support member with an array of bores extending therethrough can provide a variety of information depending on a location of the bores and one or more sensors, including whether there are products stocked at the front of the support member, the amount of product stocked in individual facings, an overall product support member stocking level, stocking levels along the front, medium, and rear of a product support member, and the like.

To achieve this, a sensor configured to obtain a reading from the compressed air supply to the product support member can be configured to send the reading to a computing device having a control circuit therein configured to analyze the reading and determine a stock level. The readings can be calibrated to specific products to further enhance stock level estimations.

Figure 1:
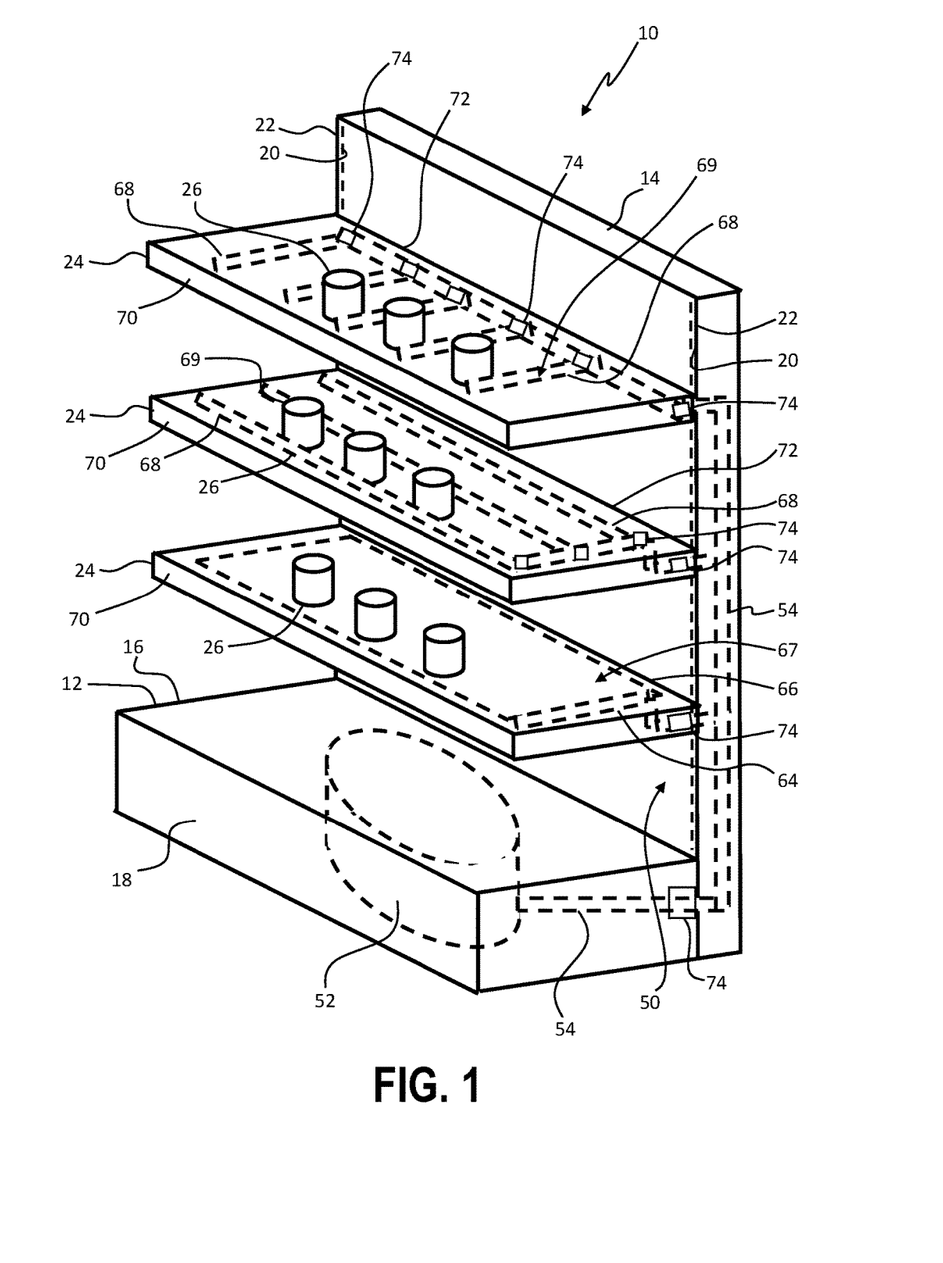
FIG. 1 is a perspective view of a shelving unit in accordance with some embodiments.
Figure 2:
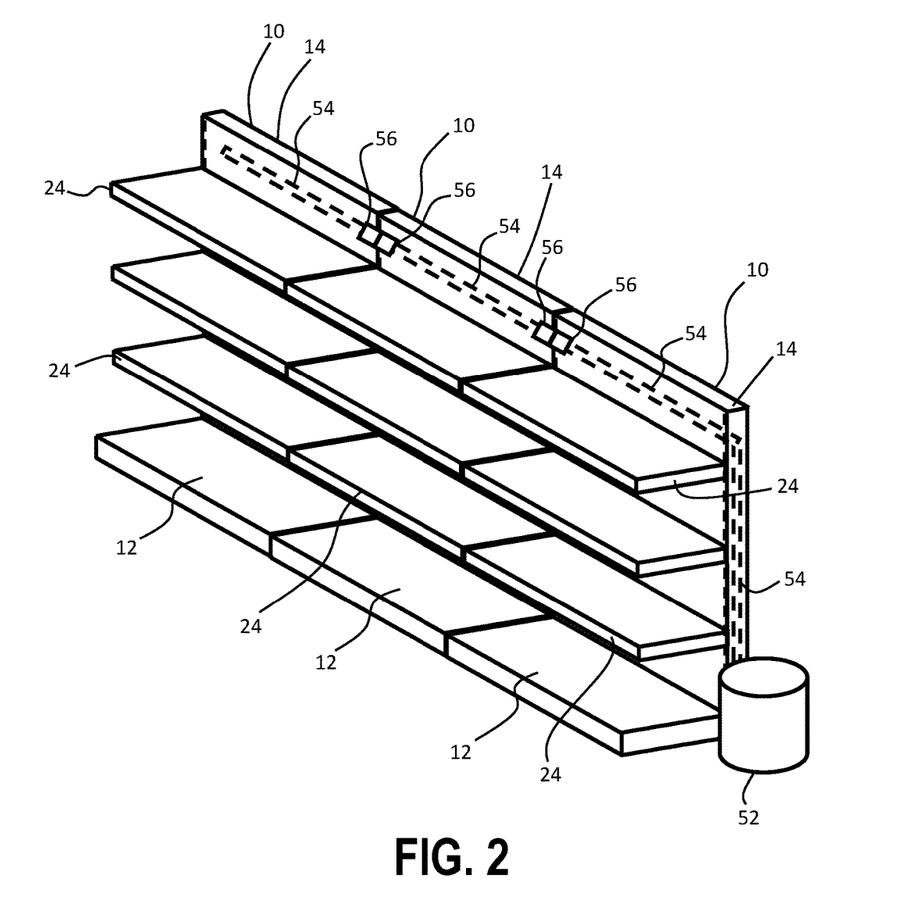
FIG. 2 is a perspective view of a plurality of shelving units in accordance with several embodiments.

An example shelving unit 10 is shown in FIG. 1. Based on a particular use, multiple shelving units 10 can be aligned in a row, as shown in FIG. 2, to produce an aisle in a retail location. The shelving unit 10 includes a base portion 12 and a back wall 14 extending upwardly therefrom. The base portion 12 can include a base deck 16 and a kick plate 18, as commonly configured. In one form, a plurality of shelf notches 20 are vertically disposed adjacent to lateral edges 22 of the back wall 14 to provide anchor points for product support members or shelves 24 mounted to the shelving unit 10. Of course, the shelves 24 can be mounted to the back wall 14 in any suitable way, including using hardware, snap-fit structure, friction fitting, or the like. Additionally, although the product support member is described herein with reference to a shelf on a shelving unit, any suitable form, location, and/or mounting location can be utilized. For example, the product support member can be a table, a shelf mounted to a wall, a shelf in a vending machine, a stand having a glass or other display extending thereover, or the like. After the shelving unit 10 is assembled, associates can then stock products 26 on the shelves 24.

If desired, one or more of the shelves 24 can include a stocking level indication assembly 50, details of which are shown in the various embodiments of FIGS. 1-6. The assembly 50 includes an air compressor 52 that is configured to supply compressed air to conduits 54. The conduits 54 can be mounted to the back wall 14 of the shelving unit, such as the front or rear surface thereof, and/or can be disposed within at least a portion of the back wall 14 to connect the air compressor 52 to positions adjacent to the shelves 24. Although compressed air is described herein, it will be understood that any suitable gas can be utilized.

By one approach, as shown in FIG. 1, each shelving unit 10 can have an associated air compressor 52. The air compressor 52 can be disposed within the base portion 12, as illustrated, mounted to the back wall 14, disposed therealong, or disposed in other suitable locations. In this form, the air compressor 52 would be dedicated to supply air to only one shelving unit 10 and can thus have a relatively small capacity.

By another approach, as shown in FIG. 2, one air compressor 52 can supply compressed air to a plurality of shelving units 10 arranged in a row or otherwise disposed adjacent to one another. In this approach, the conduits 54 can include connectors 56 configured to connect the conduits 54 of adjacent shelving units 10 together. The air compressor 52 of this form can be disposed at the end of the aisle, within the base portion 12 of one of the shelving units 10, mounted to the back wall 14 of one of the shelving units 10, disposed behind one of the shelving units, or disposed in other suitable locations. In this form, the air compressor 52 can be sized to provide a sufficient amount of compressed air to all of the shelving units 10 coupled thereto.

Figure 3:
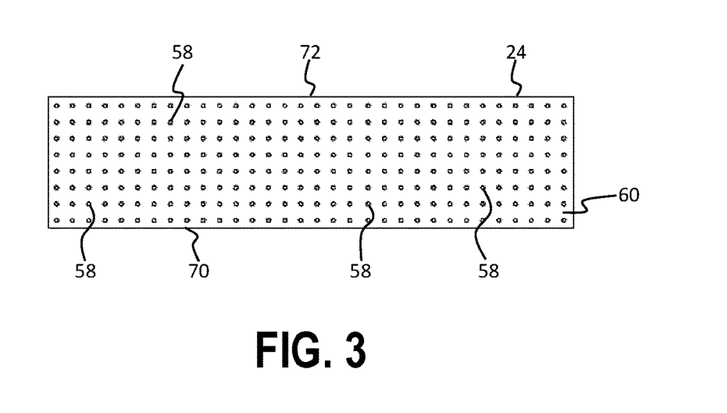
FIG. 3 is a top plan view of a product support surface in accordance with some embodiments.
Figure 5:
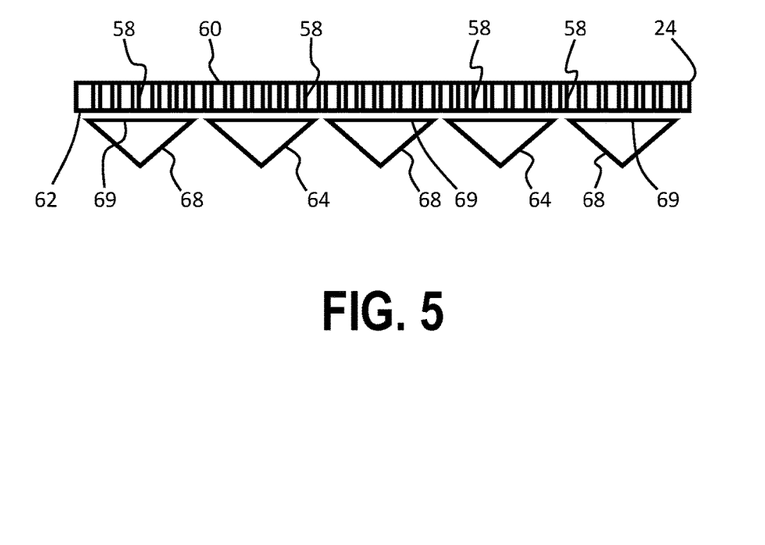
FIG. 5 is a cross-sectional view of a product support surface and outlet lines in accordance with some embodiments.
Figure 6:
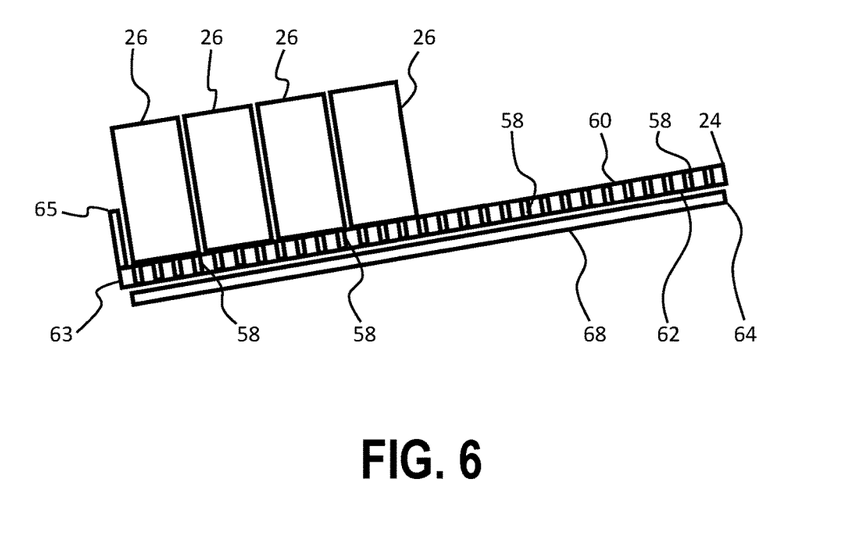
FIG. 6 is a cross-sectional view of a product support surface and outlet line in accordance with several embodiments.

As shown in FIGS. 3, 5, and 6, the shelf 24 includes a plurality of bores 58 extending generally vertically between the upper and lower surfaces 60, 62 thereof. The bores 58 provide passageways for the compressed air through the shelf 24 to thereby determine a stock level of products 26 on the shelf 24. In a preferred form, the shelf 24 includes an array of bores 58, which can be disposed in a variety of configurations depending on the desired stock level indication. For example, the array of bores 58 can include a plurality of rows and a plurality of columns. An advantage provided by utilizing an array of bores 58 is that the array can be product independent, i.e., the bores 58 can be spaced apart such that any size product can block one or more thereof. The array of bores 58 can extend across substantially the entire width and depth of the shelf 24 as shown in FIG. 3, or can be disposed on selected portions thereof, which will be discussed below with reference to compressed air outlet embodiments shown in FIG. 1.

If desired, the shelf 24 can be mounted at an incline with respect to horizontal, as shown in FIG. 6. So configured, the products 26 are supported in an angled orientation and gravity urges the products downwardly along the shelf 24 to a front edge 63 thereof. Advantageously, the assembly 50, and more specifically the compressed air impacting the bottom of the products 26, can cause the products 26 to slide down the incline of the shelf 24 on a cushion of air. This effect can be controlled based on the weight and size of the products 26 and the force applied to the product bottom by the compressed air. By one approach, the shelf 24 can include a blocking portion or member 65 disposed along the front edge 63 thereof to block a sliding product 26 from falling forwardly off the shelf 24.

As shown in FIGS. 1, 5, and 6, the conduits 54 supply compressed air to outlets 64 thereof that are disposed adjacent or mounted to the lower surface 62 of the shelf 24 such that compressed air is delivered to the array of bores 58. In a first form, the outlet 64 can be a tray or housing 66 with an open top 67 that is configured to extend below the entire width and depth of the array of bores 58. In this form, the compressed air is supplied to the interior of the tray 66 which directs the compressed air to all of the bores 58 within the array through the open top 67 thereof. This form is shown in the bottom shelf 24 of FIG. 1

In another form, the outlet 64 can be a trough or channel 68 with an open top 69 sized to provide one or more lines of bores 58 a separate supply of compressed air. If desired, the trough 68 can be sized for one, two, three, four, five, or more lines of bores 58, which can depend on intended products 26, shelf 24 size, location, among other factors. By one approach, the trough 68 can extend along the width of the shelf 24, such as that shown on the middle shelf 24 in FIG. 1. Of course, it will be understood that the trough 68 can extend distances less than the width of the shelf as desired, such as ¾, ½, ¼, or the like. Accordingly, to determine whether products 26 are facing along a front edge 70 of the shelf 24, the trough 68 can be disposed adjacent to a front edge 70 of the shelf 24 and run generally parallel with respect thereto along the width of the shelf 24. Alternatively, or in addition thereto, the assembly 50 can include a rear trough 68 disposed along a rear edge 72 of the shelf 24, and/or one or more middle troughs 68 extending along the width of the shelf 24 between the front and rear edges 70, 72 thereof. A three trough 68 configuration is shown on the middle shelf 24 of FIG. 1. With this configuration, the assembly 50 can provide an indication of facing products, intermediate stock levels, and full stock levels.

By another approach, the trough 68 can extend along the depth of the shelf 24 extending between the front and rear edges 70, 72 thereof. So configured, the trough 68 can be used to determine a stock level for a specific facing or group of facings by extending along the depth thereof. The number and size of the troughs 68 can be selected as desired for a particular application. For example, FIG. 1 shows five troughs 68 on the top shelf 24 thereof. By yet another approach, the trough 68 can extend at an angle with respect to the front and rear edges 70, 72 thereof.

Figure 4:
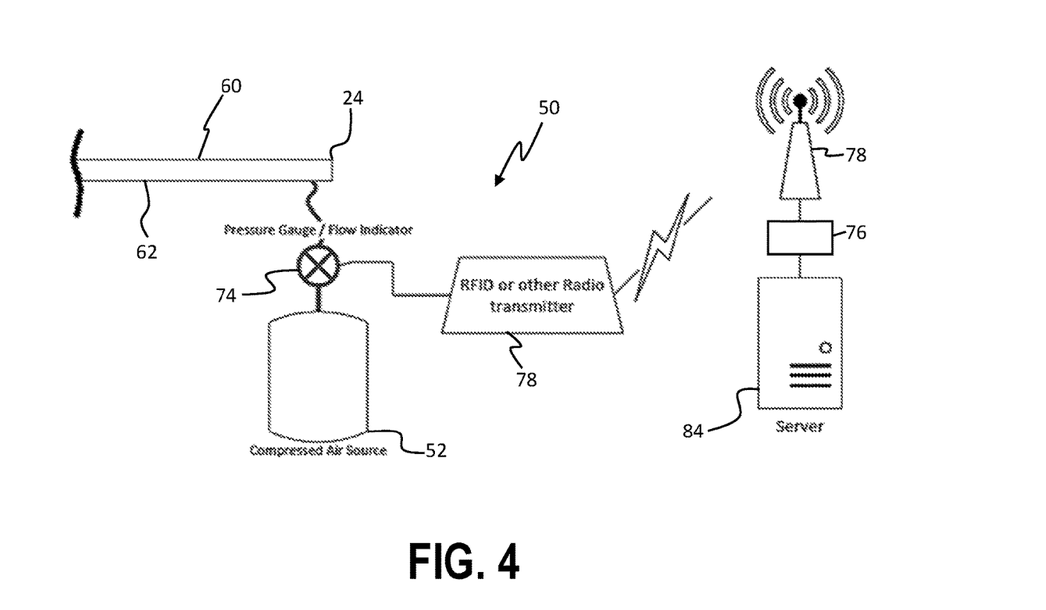
FIG. 4 is a diagrammatic view of a compressed air stocking level assembly in accordance with several embodiments.

The assembly 50 can determine a stock level by monitoring the flow of compressed air from the air compressor 52 with a sensor 74. The sensor 74 can be configured to measure the flow rate of compressed air within the conduit 54 or can be configured to measure a pressure of the compressed air within the conduit 54. The sensor 74 can be coupled to the conduit 54 at any desired location. For example, the sensor 74 can be coupled to the conduit 54 adjacent to the air compressor 52 so that the sensor 74 can monitor the compressed air supply to the entire shelving unit 10 or series of shelving units 10. By other approaches, each shelving unit 10, each shelf 24, and/or each outlet 64 can have a dedicated sensor 74. As such, the sensor 74 location can be selected based on the degree of specificity desired. By monitoring each outlet 64, as described below, the stock level of individual rows or columns of products 26 can be determined, while monitoring shelves 24 or shelving units 10 provides relatively lower degrees of stocking level specificity, respectively.

Thereafter, the sensor 74 can send the reading to a computing device 76 having a control circuit therein over a wired connection or over any suitable network, utilizing radio communication, radio-frequency identification (RFID), Bluetooth, WiFi, near field communication, or the like, utilizing suitable hardware 78, including receivers, transmitters, and/or transceivers. The computing device 76 can include a memory and may generally be any processor-based device such as one or more of a computer system, a server, a networked computer, a cloud-based server, etc. The control circuit 76 may comprise a central processing unit, a processor, a microprocessor, and the like. The control circuit 76 may be configured to execute computer-readable instructions stored on the memory. The memory may comprise volatile and/or non-volatile computer-readable storage memory and have stored upon it a set of computer readable instructions which, when executed by the control circuit 76, cause the system to perform operations as described herein.

By one approach, the control circuit 76 can be calibrated. The control circuit 76 can receive a reading from the sensor 74 when the assembly 50 has no products 26 stocked thereon to establish a baseline measurement for a stock level projection. Next, the control circuit 76 can receive a reading from the sensor 74 when the assembly 50 is in a fully stocked configuration to establish a top measurement for the stock level projection. As such, the control circuit 76 can compare subsequently received readings from the sensor 74 to the stock level projection to estimate a current stock level for the assembly 50.

The control circuit 76 can further be provided with the products 26 intended for the assembly 50, such as through a remote database or server device 84, or can be configured to access product location information, stored locally or on the remote database or server device 84, to establish an intended number of products 26 for the fully stocked configuration. Identification of the baseline and fully stocked readings can be provided from the remote server device 84, which can be configured to coordinate tasks, such as stocking and product location. So configured, the control circuit 76 can thereafter compare a subsequently received reading from the sensor 74 to the stock level projection to estimate an approximate stock level and/or number of products 26 stocked on the assembly 50.

If desired, the control circuit 76 can further compare the estimated number of products 26 on the assembly 50 to a predetermined stock number, such as a number that would indicate a low stock level. In response to determining that the estimated number is at or below the predetermined stock number, the control circuit 76 can be configured to send out a low stock signal. The low stock signal can be sent or routed to any suitable recipients, such as to create tasks therefor, including devices for stocking associates, devices for ordering additional stock, and the like.

Additionally, the estimated number of products can be used by the control circuit 76 to generate warning signals. For example, if the estimates indicate an anomaly, the control circuit 76 can be configured to send out a warning signal to suitable recipients to check on the assembly 50. In one particular example, the assembly 50 can be utilized to monitor products 26, such as products having a high value, age restriction, safety risk, and so forth. In such instances, the control circuit 76 can be configured to send a warning signal in response to any change identified by the sensor 74.

In some embodiments, an apparatus is described herein that includes a product support structure having upper and lower surfaces, where the product support structure is configured to support products on the upper surface thereof. The apparatus further includes an array of bores that extend through the product support structure between the upper and lower surfaces thereof, such that products stocked on the upper surface of the product support structure block one or more of the bores. The apparatus also includes an air compressor configured to output compressed air therefrom, a conduit having an inlet coupled to the air compressor and outlets disposed adjacent to the lower surface of the product support structure such that the compressed air flows through all unblocked bores in the array, and a sensor coupled to the conduit that is configured to obtain a reading therefrom. The apparatus further includes a control circuit configured to receive the reading from the sensor and determine a product support structure fullness level based on the reading.

By several approaches, the apparatus can include a shelving unit having a base portion and an upstanding wall portion, where the product support structure is a shelf mounted to the upstanding wall portion of the shelving unit.

In one form, the air compressor can be disposed within the base portion of the shelving unit and the conduit can extend from the air compressor within the base portion, along the upstanding wall portion, and to the outlets thereof disposed adjacent to the lower surface of the product support structure.

In another form, the shelving unit can include a plurality of shelving units with the air compressor providing compressed air to each of the plurality of shelving units, and the conduit can further include connectors between the plurality of shelving units.

By some approaches, the conduit outlets can be incorporated into one or more outlet lines extending along and adjacent to the lower surface of the product support structure.

In one form, the one or more outlet lines can include a plurality of outlet lines and the sensor can include a plurality of sensors with each outlet line having an associated sensor.

In another form, the product support structure can include a front edge and the one or more outlet lines can include a front outlet line extending along the lower surface of the product support structure closely adjacent to the front edge thereof such that the control circuit can determine whether the products disposed on the product support structure are facing. In a further form, the product support structure can include a rear edge and the one or more outlet lines can further include a rear outlet line extending along the lower surface of the product support structure closely adjacent to the rear edge thereof and a middle outlet line extending along the lower surface of the product support structure intermediate of the front and rear outlet lines.

In yet another form, the product support structure can include front and rear edges and the one or more outlet lines can include one or more outlet lines extending along the lower surface of the product support structure between the front and rear edges thereof such that the control circuit can determine a facing fullness level.

By several approaches, the control circuit can be configured to determine a number of products on the product support structure by being calibrated with a baseline reading where there are no products on the product support structure and a full reading where the product support structure is fully stocked to determine a fullness level projection and comparing the reading to the fullness level projection.

Figure 7:
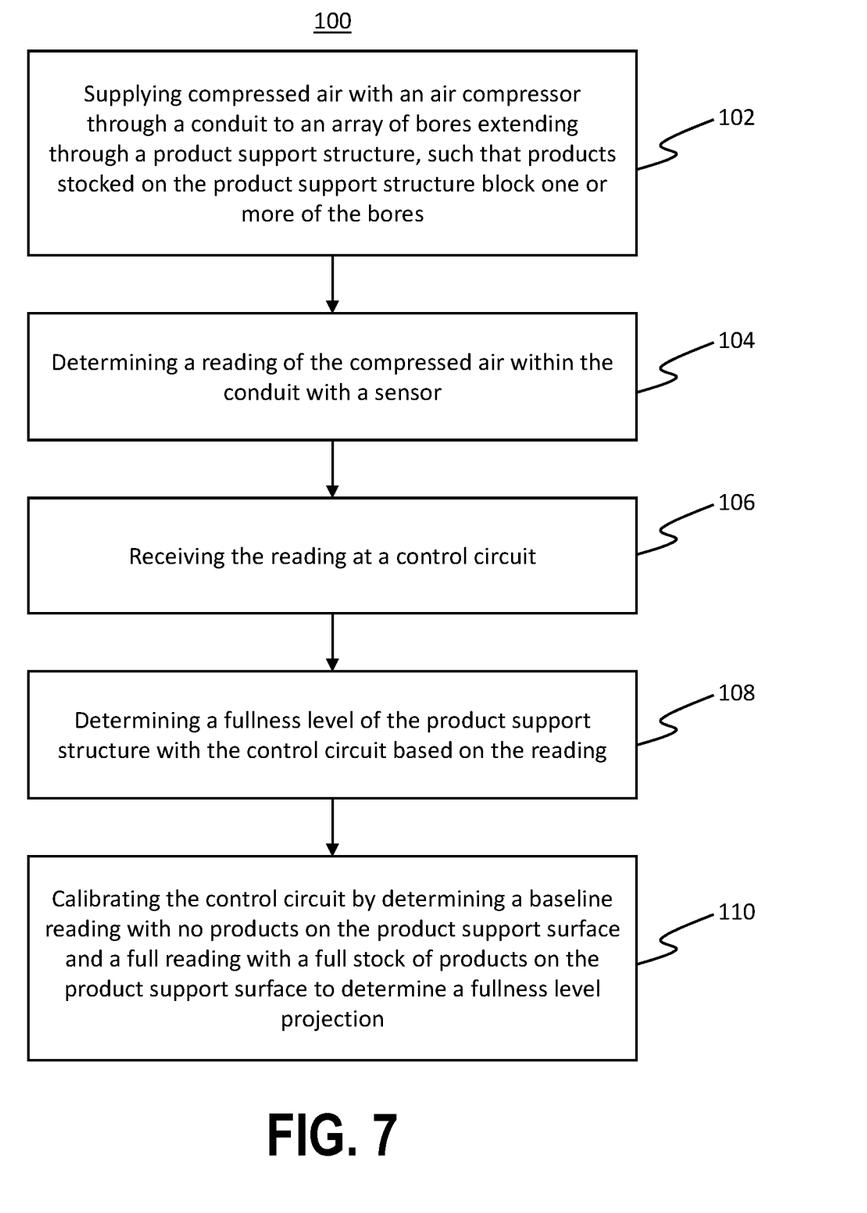
FIG. 7 is a flowchart in accordance with some embodiments.

In several embodiments and as shown in FIG. 7, a method 100 for determining a product support structure fullness level is described herein that includes supplying 102 compressed air with an air compressor through a conduit to an array of bores extending through a product support structure, such that products stocked on the product support structure block one or more of the bores, determining 104 a reading of the compressed air within the conduit with a sensor, receiving 106 the reading at a control circuit, and determining 108 a fullness level of the product support structure with the control circuit based on the reading.

By some approaches, supplying the compressed air through the conduit to the array of bores can include supplying the compressed air through one or more outlet lines extending along and adjacent to a lower surface of the product support structure.

In one form, the one or more outlet lines includes a plurality of outlet lines and determining the reading of the compressed air within the conduit with the sensor includes determining a reading for each of the plurality of outlet lines with a plurality of sensors.

In another form, the one or more outlet lines include a front outlet line extending along the lower surface of the product support surface adjacent to a front edge thereof, and determining the fullness level of the product support structure comprises determining whether there are facing products on the product support structure. In a further form, the one or more outlet lines further include a rear outlet line and a middle outlet line, the rear outlet line extending along the lower surface of the product support structure closely adjacent to a rear edge thereof and the middle outlet line extending along the lower surface of the product support structure intermediate of the front and rear outlet lines, and determining the fullness level comprises determining a fullness level at front, middle, and rear portions of the product support structure.

In yet another form, the one or more outlet lines includes one or more outlet lines extending along the lower surface of the product support structure between front and rear edges thereof, and determining the fullness level comprises determining a facing fullness level.

By several approaches, the method 100 can further include calibrating 110 the control circuit by determining a baseline reading with no products on the product support surface and a full reading with a full stock of products on the product support surface to determine a fullness level projection, and wherein determining the fullness level includes determining a percentage of product support structure fullness by comparison of the reading to the fullness level projection.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A fullness level indication assembly for a retail product storage structure, the stock level indication assembly comprising:
   a product support structure having upper and lower surfaces and configured to support products on the upper surface thereof;
   an array of bores extending through the product support structure between the upper and lower surfaces thereof, the products stocked on the upper surface of the product support structure blocking one or more of the bores;
   an air compressor configured to output compressed air therefrom;
   a conduit having an inlet coupled to the air compressor and outlets disposed adjacent to the lower surface of the product support structure such that the compressed air flows through all unblocked bores in the array;
   a sensor coupled to the conduit and configured to obtain a reading of the compressed air within the conduit therefrom;
   a control circuit configured to receive the reading from the sensor and determine a product support structure fullness level based on the reading.

2. The stock level indication assembly of claim 1, wherein the sensor comprises one of a pressure sensor or a flow rate sensor.

3. The stock level indication assembly of claim 1, wherein the array of bores includes a plurality of rows and a plurality of columns.

4. The stock level indication assembly of claim 1, further comprising a shelving unit having a base portion and an upstanding wall portion, and wherein the product support structure comprises a shelf mounted to the upstanding wall portion of the shelving unit.

5. The stock level indication assembly of claim 4, wherein the air compressor is disposed within the base portion of the shelving unit and the conduit extends from the air compressor within the base portion, along the upstanding wall portion, and to the outlets thereof disposed adjacent to the lower surface of the product support structure.

6. The stock level indication assembly of claim 4, wherein the shelving unit comprises a plurality of shelving units with the air compressor providing compressed air to each of the plurality of shelving units, and the conduit further includes connectors between the plurality of shelving units.

7. The stock level indication assembly of claim 4, wherein the shelf is inclined with respect to horizontal, such that the compressed air aids in moving the products stocked on the shelf forwardly.

8. The stock level indication assembly of claim 1, wherein the conduit outlets are incorporated into one or more outlet lines extending along and adjacent to the lower surface of the product support structure.

9. The stock level indication assembly of claim 8, wherein the one or more outlet lines comprise a plurality of outlet lines, and the sensor comprises a plurality of sensors with each outlet line having an associated sensor.

10. The stock level indication assembly of claim 8, wherein the product support structure includes a front edge, and the one or more outlet lines comprise a front outlet line extending along the lower surface of the product support structure adjacent to the front edge thereof such that the control circuit can determine whether the products disposed on the product support structure are facing.

11. The stock level indication assembly of claim 10, wherein the product support structure further includes a rear edge, and the one or more outlet lines further comprise a rear outlet line extending along the lower surface of the product support structure adjacent to the rear edge thereof and a middle outlet line extending along the lower surface of the product support structure intermediate of the front and rear outlet lines.

12. The stock level indication assembly of claim 8, wherein the product support structure includes front and rear edges, and the one or more outlet lines comprise one or more outlet lines extending along the lower surface of the product support structure between the front and rear edges thereof such that the control circuit can determine a facing fullness level.

13. The stock level indication assembly of claim 1, wherein the bores are arranged at locations of the products support structure independent of dimensions of products intended to be placed thereon.

14. The stock level indication assembly of claim 1, wherein the control circuit is configured to determine a number of products on the product support structure by being calibrated with a baseline reading where there are no products on the product support structure and a full reading where the product support structure is fully stocked to determine a fullness level projection and comparing the reading to the fullness level projection.

15. A method for determining a fullness level for a retail product storage structure, the method comprising:
   supplying compressed air with an air compressor through a conduit to an array of bores extending through a product support structure, such that products stocked on the product support structure block one or more of the bores;
   determining a reading of the compressed air within the conduit with a sensor;
   receiving the reading at a control circuit;
   determining a fullness level of the product support structure with the control circuit based on the reading.

16. The method of claim 15, wherein determining the reading of the compressed air with the sensor comprises determining one of a flow rate reading or a pressure reading with the sensor.

17. The method of claim 15, wherein supplying the compressed air through the conduit to the array of bores further comprises supplying the compressed air through one or more outlet lines extending along and adjacent to a lower surface of the product support structure.

18. The method of claim 17, wherein the one or more outlet lines comprises a plurality of outlet lines and determining the reading of the compressed air within the conduit with the sensor comprises determining a reading for each of the plurality of outlet lines with a plurality of sensors.

19. The method of claim 17, wherein the one or more outlet lines comprise a front outlet line extending along the lower surface of the product support surface adjacent to a front edge thereof, and determining the fullness level of the product support structure comprises determining whether there are facing products on the product support structure.

20. The method of claim 19, wherein the one or more outlet lines further comprise a rear outlet line and a middle outlet line, the rear outlet line extending along the lower surface of the product support structure adjacent to a rear edge thereof and the middle outlet line extending along the lower surface of the product support structure intermediate of the front and rear outlet lines, and determining the fullness level comprises determining a fullness level at front, middle, and rear portions of the product support structure.

21. The method of claim 17, wherein the one or more outlet lines comprises one or more outlet lines extending along the lower surface of the product support structure between front and rear edges thereof, and determining the fullness level comprises determining a facing fullness level.

22. The method of claim 15, further comprising calibrating the control circuit by determining a baseline reading with no products on the product support surface and a full reading with a full stock of products on the product support surface to determine a fullness level projection, and wherein determining the fullness level comprises determining a percentage of product support structure fullness by comparison of the reading to the fullness level projection.

\* \* \* \* \*